(12) United States Patent
Shim et al.

(10) Patent No.: US 9,490,505 B2
(45) Date of Patent: Nov. 8, 2016

(54) ELECTRODE ASSEMBLY INCLUDING SEPARATOR FOR IMPROVING SAFETY AND LITHIUM SECONDARY BATTERY INCLUDING THE SAME

(71) Applicant: LG Chem, Ltd., Seoul (KR)

(72) Inventors: Hye Lim Shim, Daejeon (KR); Duk Hyun Ryu, Daejeon (KR); Cha Hun Ku, Daejeon (KR); Jung Jin Kim, Daejeon (KR); Nak Gi Sung, Chungcheongnam-do (KR)

(73) Assignee: LG Chem, Ltd. (KR)

( * ) Notice: Subject to any disclaimer, the term of this patent is extended or adjusted under 35 U.S.C. 154(b) by 180 days.

(21) Appl. No.: 13/950,847

(22) Filed: Jul. 25, 2013

(65) Prior Publication Data

US 2013/0309530 A1    Nov. 21, 2013

Related U.S. Application Data

(63) Continuation of application No. PCT/KR2012/006029, filed on Jul. 27, 2012.

(30) Foreign Application Priority Data

Jul. 29, 2011    (KR) ........................ 10-2011-0076233

(51) Int. Cl.
*H01M 2/16*    (2006.01)
*H01M 10/42*    (2006.01)
(Continued)

(52) U.S. Cl.
CPC ....... *H01M 10/4235* (2013.01); *H01M 2/1673* (2013.01); *H01M 2/1686* (2013.01);
(Continued)

(58) Field of Classification Search
CPC ........... H01M 2/1686; H01M 2/1673; H01M 10/052; H01M 10/0585; H01M 10/4235; H01M 2200/20; H01M 2220/20; Y02E 60/122; Y02T 10/7011
See application file for complete search history.

(56) References Cited

U.S. PATENT DOCUMENTS

2008/0241666 A1*  10/2008  Baba et al. .................. 429/158
2008/0268340 A1   10/2008  Kuwahara et al.
(Continued)

FOREIGN PATENT DOCUMENTS

CN       1788370 A    6/2006
CN     101242011 A    8/2008
(Continued)

OTHER PUBLICATIONS

English translation of KR Publication 10-2007-0082931, Aug. 2007.*
(Continued)

*Primary Examiner* — Brittany Raymond
(74) *Attorney, Agent, or Firm* — Lerner, David, Littenberg, Krumholz & Mentlik, LLP

(57) ABSTRACT

The present invention relates to an electrode assembly including a separator and a lithium secondary battery including the same for improving safety. The electrode assembly including a positive electrode, a negative electrode and a separator further includes a gasification material possibly being electrolyzed at a certain voltage to generate a gas. Since the electrode assembly and the lithium secondary battery including the same include the gasification material possibly being electrolyzed at the certain voltage to generate the gas, the safety of the battery may be increased. Since the gasification material is coated on the surface of the separator not on the electrode, the resistance increase of the battery may be restrained and the capacity lowering of the battery may be remarkably decreased. The lifetime of the battery is good.

8 Claims, 3 Drawing Sheets

(51) Int. Cl.
*H01M 10/052* (2010.01)
*H01M 10/0585* (2010.01)

(52) U.S. Cl.
CPC ....... *H01M10/052* (2013.01); *H01M 10/0585* (2013.01); *H01M 2200/20* (2013.01); *H01M 2220/20* (2013.01); *Y02E 60/122* (2013.01); *Y02T 10/7011* (2013.01)

(56) References Cited

U.S. PATENT DOCUMENTS

| | | | | |
|---|---|---|---|---|
| 2010/0112437 | A1* | 5/2010 | Yoshikawa | H01M 2/166 429/207 |
| 2012/0141846 | A1* | 6/2012 | Iwayasu | H01M 2/345 429/61 |

FOREIGN PATENT DOCUMENTS

| | | | |
|---|---|---|---|
| JP | 2008277087 | A | 11/2008 |
| JP | 2009-238387 | A | 10/2009 |
| JP | 2010-199035 | A | 9/2010 |
| KR | 10-2007-0082931 | * | 8/2007 |
| KR | 10-2007-0090500 | * | 9/2007 |
| KR | 20070090500 | A | 9/2007 |
| KR | 20070105724 | A | 10/2007 |
| KR | 20080058967 | A | 6/2008 |
| KR | 100950038 | B1 | 3/2010 |

OTHER PUBLICATIONS

English translation of KR Publication 10-2007-0090500, Sep. 2007.*
International Search Report for Application No. PCT/KR2012/006029 dated Feb. 18, 2013.
Office Action from Chinese Application No. 201280028747.7, dated May 6, 2015.

* cited by examiner

ELECTRODE ASSEMBLY INCLUDING SEPARATOR FOR IMPROVING SAFETY AND LITHIUM SECONDARY BATTERY INCLUDING THE SAME

TECHNICAL FIELD

This application claims priority under 35 USC §119 to Korean Patent Application No. 10-2011-0076233 filed on Jul. 29, 2011 in the Korean Intellectual Property Office (KIPO), the entire disclosure of which is incorporated herein by reference.

The present invention relates to an electrode assembly including a separator for improving safety and a lithium secondary battery including the same, and more particularly, to an electrode assembly including a positive electrode, a negative electrode and a separator, and including a gasification material coated on the surface of the separator and electrolyzed at a certain voltage to generate a gas, and a lithium secondary battery including the same.

BACKGROUND OF THE INVENTION

As portable wireless devices such as a video camera, a portable phone, a portable computer, and the like, reduce weight and are highly functionalized, researches on secondary batteries used as a driving power source thereof have been conducted a lot. The secondary batteries include, for example, a nickel cadmium battery, a nickel hydrogen battery, a nickel zinc battery, a lithium secondary battery and the like. Among the batteries, the lithium secondary battery is rechargeable, has a small size and a large capacity, and has a high operating voltage and a high energy density per unit weight. Thus, the lithium secondary battery is widely used in high-tech electronic device fields.

Lithium generally used as a material for a secondary battery has a small atomic weight and is an appropriate material for manufacturing a battery having a large electric capacity per unit weight. Meanwhile, since lithium vigorously reacts with water, a non-aqueous electrolyte is used in a lithium-based battery. In this case, without being affected by an electrolysis voltage of water, an electromotive force of about 3 V to 4V may be generated in the lithium-based battery.

Lithium secondary batteries mainly use a lithium-based oxide as a positive electrode active material and a carbon-based material as a negative active material. Generally, the lithium secondary batteries are classified into a liquid electrolyte battery and a polymer electrolyte battery according to the kind of the electrolyte. The battery using the liquid electrolyte is called as a lithium ion battery and the battery using the polymer electrolyte is called as a lithium polymer battery. In addition, the lithium secondary battery is manufactured in various shapes, and typically includes a cylinder shape, a polygon shape and a pouch shape.

Commonly, the lithium secondary battery includes an electrode assembly including the winding structure of a positive electrode coated with a positive electrode active material, a negative electrode coated with a negative electrode active material and a separator disposed between the positive electrode and the negative electrode for preventing short and permitting the migration of lithium ions, a case for receiving the electrode assembly and an electrolyte injected into the case so as to permit the migration of the lithium ions.

In the lithium secondary battery, the short between the electrodes may be easily generated during charging/discharging, and the increase of pressure or the deteriorating phenomenon of the electrode according to overcharging and over-discharging may be easily generated. These are factors threatening the safety of the lithium secondary battery.

When the lithium secondary battery is overcharged, the electrolyte may be vaporized from about the upper portion of the electrode assembly to increase the resistance of the battery. In addition, the transformation of the electrode assembly may begin from about the center portion thereof to precipitate lithium. Of course, a local heating may begin according to the increase of the resistance at the upper portion of the electrode assembly, and the temperature of the battery may be rapidly increased. In this state, the internal pressure may be rapidly increased by an electrolyte additive such as cyclohexylbenzene (CHB) and biphenyl (BP), which may be generally decomposed and generate a gas during the overcharging. When the amount of the electrolyte additive such as cyclohexylbenzene (CHB) and biphenyl (BP) is increased, the amount of the gas generated during the overcharging may be increased. However, in this case, the capacity or the quality of the battery may be deteriorated and the lifetime of the battery may be decreased.

In order to solve the above-described defects, a material possibly being electrolyzed at a certain voltage during overcharging and generating a gas may be included in the electrode active material to increase the safety of the battery and to make the battery slim when compared with the battery including the electrolyte additive. However, when the material for rapidly exhausting a large amount of a gas during overcharging is added in the positive electrode active material, the amount of the positive electrode active material may be relatively decreased. In this case, the battery capacity may be decreased, the resistance may be increase, and the lifetime of the battery may be decreased due to repeated charging/discharging.

Accordingly, researches on a lithium secondary battery preventing the danger of explosion during overcharging, having an improved safety of a positive electrode active material during charging in order to satisfy a high capacity and a slim structure, operating a safety device such as a safety vent and a PTC device at a proper time, and having a minimized capacity deterioration of the battery, are required.

DETAILED DESCRIPTION

Technical Problem

According to embodiments of the present disclosure, an electrode assembly including a positive electrode, a negative electrode and a separator, and further including a gasification material coated on the surface of the separator and possibly being electrolyzed at a certain voltage to generate a gas is provided.

However, the technical defects of the present disclosure is not limited to the above referred defects, however, other unmentioned defects may be clearly understood by the persons skilled in the art from the description below.

Technical Solution

According to an aspect of the present invention, there is provided a lithium secondary battery including an electrode assembly including a positive electrode, a negative electrode and a separator, wherein the electrode assembly further includes a gasification material coated on the separator and possibly being electrolyzed at a certain voltage to generate a gas.

According to another aspect of the present invention, there is provided a lithium secondary battery including a current interrupt device (CID) being operated when an internal pressure of a battery increases at a certain voltage for breaking a current, wherein the battery comprises the electrode assembly.

According to further another aspect of the present invention, there is provided a medium-large size battery module or a battery pack including a plurality of the electrically connected lithium secondary batteries.

Effect of the Invention

The electrode assembly including the separator for improving the safety and the lithium secondary battery including the same according to the present invention improve the safety of the battery by including a gasification material possibly being electrolyzed at an overcharge state to generate a gas. In addition, since the gasification material is coated not on the electrode but on the surface of the separator to restrain the increase of resistance and to largely decrease the capacity lowering of the battery. Thus, the lifetime of the battery is good.

DESCRIPTION OF EMBODIMENTS

In related arts, examples on coating a gasification material possibly being electrolyzed and generating a gas at an overcharge state on a separator has not been disclosed. The inventors of the present invention confirmed that the safety of the battery may be ensured and the increase of the resistance may be restrained by coating the gasification material on the separator and completed the present inventive concept.

Particularly, an electrode assembly including a positive electrode, a negative electrode and a separator is provided in the example embodiments, wherein the electrode assembly includes a gasification material coated on the surface of the separator to be electrolyzed at a certain voltage to generate a gas.

Hereinafter, example embodiments according to the present invention will be described in detail with reference to attached drawings.

Various example embodiments will be described more fully hereinafter with reference to the accompanying drawings, in which various modifications and variations may be made. The present inventive concept may, however, include modifications, equivalents and replacements without departing from the spirit and scope of the invention as defined by the appended claims.

Figure 1:
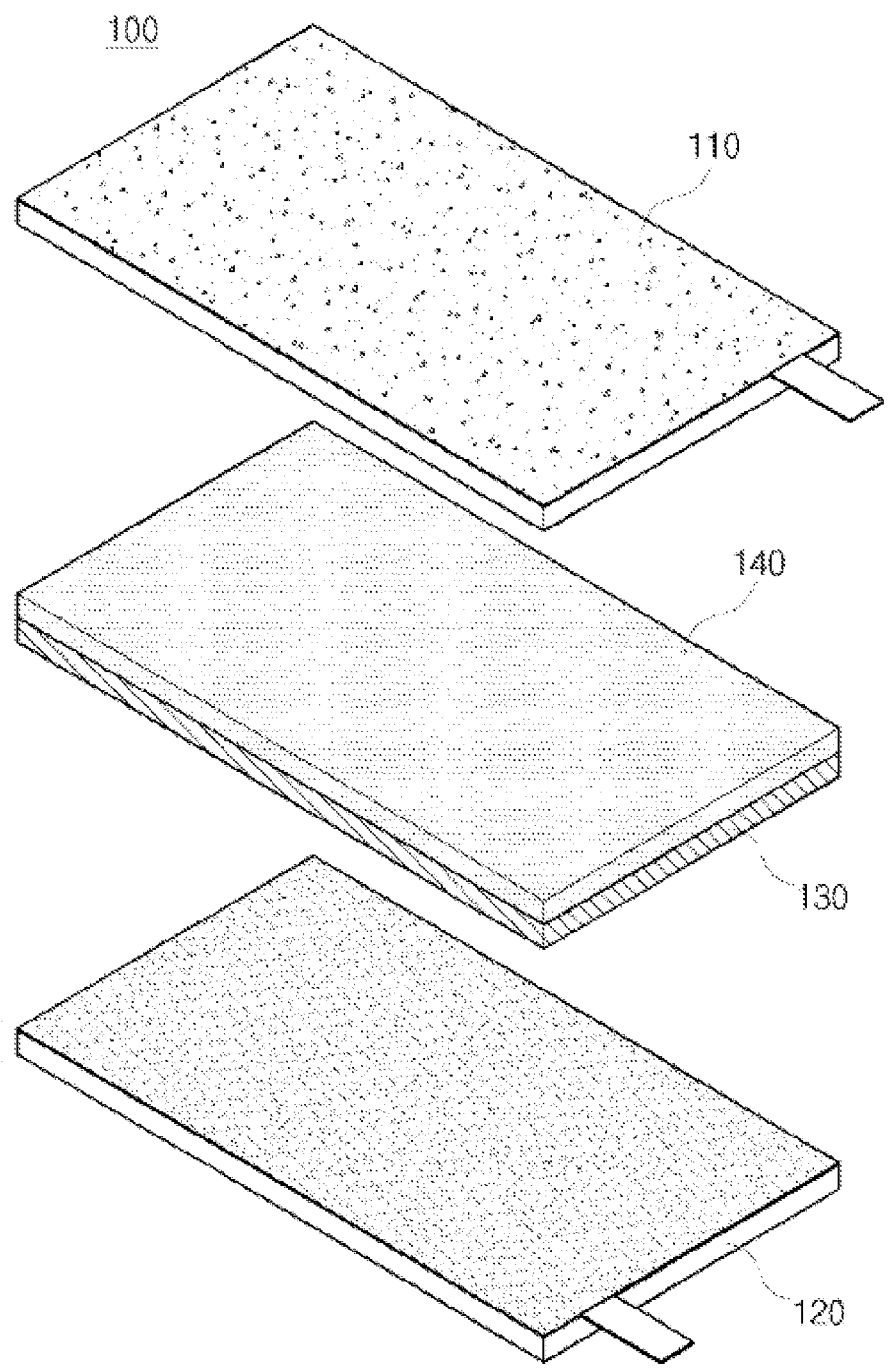
FIG. 1 is a cross-sectional view of an electrode assembly in accordance with an example embodiment.

FIG. 1 is a cross-sectional view of an electrode assembly in accordance with an example embodiment.

An electrode assembly 100 according to example embodiments may be manufactured by winding a positive electrode 110 including a positive electrode active material in a certain region of a positive electrode current collector, a negative electrode 120 including a negative active material formed in a certain region of a negative electrode current collector, and a separator 130 disposed between the positive electrode and the negative electrode to prevent the short of the positive electrode and the negative electrode and to permit the migration of lithium ions, into a jelly-roll shape. In addition, the electrode assembly 100 may further include a positive electrode tab connected to the positive electrode and a negative electrode tab connected to the negative electrode. In this case, the positive electrode tab and the negative electrode tab may be formed in the same direction, or the positive electrode tab and the negative electrode tab may be formed in the opposite direction to each other.

Through coating a portion or the whole of the surface of the separator 130 with a gasification material 140, the safety of the battery may be improved, the capacity lowering of the battery may be largely decreased, and the increase of the resistance may be restrained.

The separator 130 may prevent the short of the positive electrode and the negative electrode and permit the migration of only lithium ions. The separator 130 may be selected from the group consist of polyethylene, polypropylene, a polyethylene/polypropylene double layer, a polyethylene/polypropylene/polyethylene triple layer, a polypropylene/polyethylene/polypropylene triple layer and an organic fiber filter paper, without limitation.

The coating may be performed by using a binder, and the binder may be a polyvinylidene fluoride (PVdF) resin, without limitation. In addition, the coating may be conducted by using any coating method known in this art applied and may include a 3-roll reverse system, a spray system, and a gravure roll system.

Figure 2:
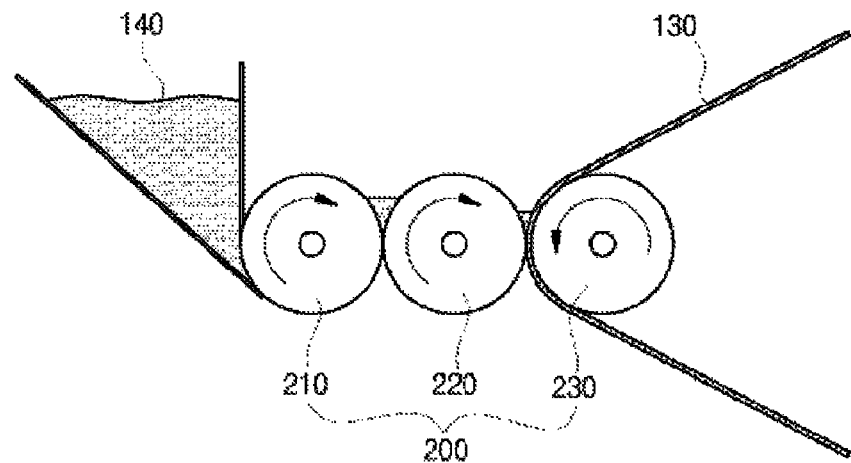
FIG. 2 illustrates a coating method of a gasification material by a 3-roll reverse system.

FIG. 2 illustrates a coating method of a gasification material by a 3-roll reverse system.

As illustrated in FIG. 2, the gasification material 140 may be coated by using three rolls 210, 220 and 230 meshed to each other according to the 3-roll reverse system. Here, the roll positioned at the left side is called as a left roll 210, the roll positioned at the center portion is called as a center roll 220 and the roll positioned at the right side is called as a right roll 230 for the convenience. Here, the number of the rolls is not limited. The gasification material 140 for the coating is supplied to the left roll 210, and the gasification material 140 may be transferred from the left roll 210 while rotating to the clockwise to the center roll 220 from a front view. The center roll 220 also transfers the transferred gasification material 140 while rotating to the clockwise to the right roll 230. The amount of the gasification material 140 may decrease during the transferring and be controlled to an appropriate amount at the right roll 230. The separator 130 to be coated is located on the right roll 230. The right roll 230 rotates counterclockwise different from the other rolls 210 and 220 so that the right roll 230 interacts with the center roll 220 to move the separator 130 in a certain direction.

Figure 3:
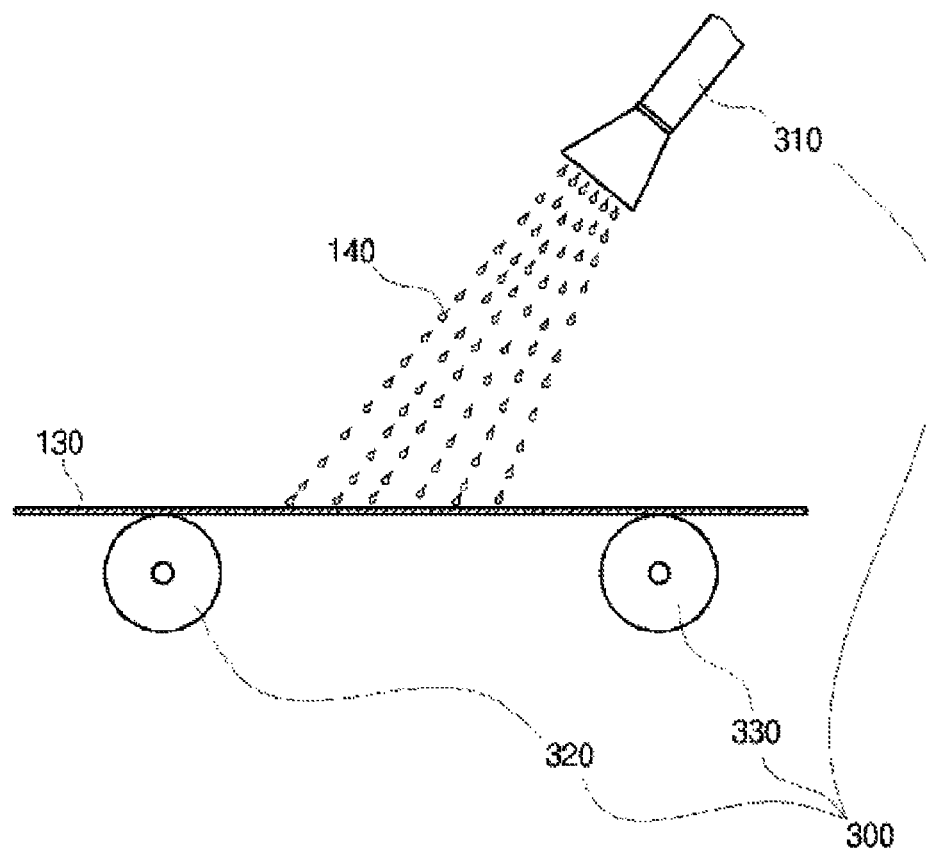
FIG. 3 illustrates a coating method of a gasification material by a spray system.

FIG. 3 illustrates a coating method of a gasification material by a spray system.

As illustrated in FIG. 3, according to the spray system, a gasification material 140 may be moved to a separator 130 to be coated by using left and right rolls 320 and 330. Then, a sprayer 310 is installed at an upper portion, and the gasification material 140 is sprayed. In this case, the roll positioned at the left side is called as a left roll 320, and the roll positioned at the right side is called as a right roll 330 for the convenience. The number of the roll is not limited.

Figure 4:
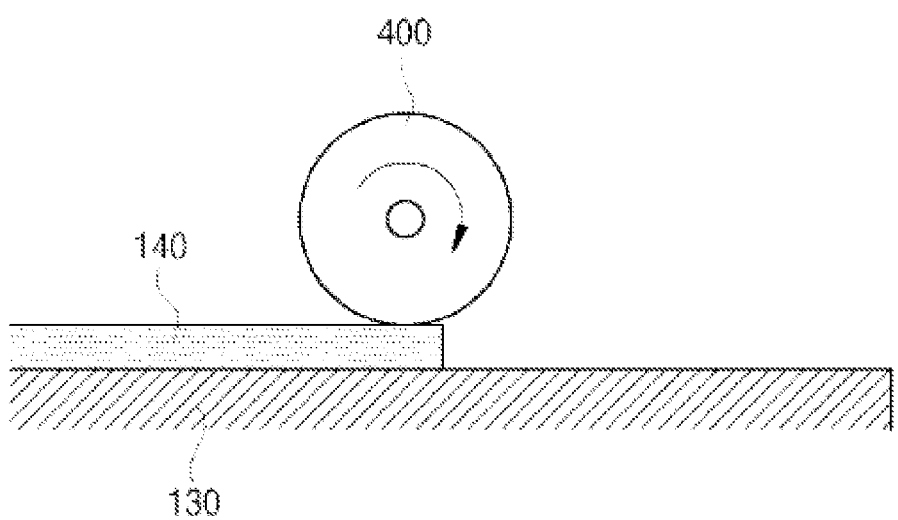
FIG. 4 illustrates a coating method of a gasification material by a gravure roll system.

FIG. 4 illustrates a coating method of a gasification material by a gravure roll system.

As illustrated in FIG. 4, according to the gravure roll method, the surface of a roller 400 is coated with a gasification material 140, and the roller 400 is rotated on a separator 130 to be coated along an arrow direction to coat the gasification material 140.

The gasification material may be desirably coated on the surface of the separator facing the positive electrode. Since the gasification material may be electrolyzed at an overcharge state, the material may generate a gas faster during overcharging when coated at the surface of the separator facing the positive electrode. In addition, the amount of the gasification material is not particularly limited but may be 0.05 wt % to 10 wt % based on the total amount of the positive electrode active material. When the gasification material is less than 0.05 wt % based on the total amount of the positive electrode active material, the material may be electrolyzed at the overcharge state, and the generation of a sufficient amount of the gas may be difficult. In this case, the confirmation of the safety may be insufficient. When the amount of the gasification material exceeds 10 wt % based on the total amount of the positive electrode active material, the function of the separator may become difficult, and the function of the battery may be deteriorated.

In addition, the gasification material may be electrolyzed at a potential difference between internal electrodes by at least 4.5 V, and may be a lithium carbonate composition. The lithium carbonate composition may include lithium carbonate ($Li_2CO_3$), without limitation. In this case, lithium carbonate ($Li_2CO_3$) is a material being decomposed at about 4.8 V to 5.0 V and gasified. The decomposing reaction may be illustrated as the following reaction formula.

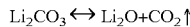

That is, lithium carbonate ($Li_2CO_3$) is decomposed at 4.8 V to 5.0 V into lithium oxide ($Li_2O$) and carbon dioxide ($CO_2$). In this case, the pressure of carbon dioxide and the pressure due to the gasification of cyclohexylbenzene (CHB), biphenyl (BP) and the like contained in the electrolyte when the internal temperature of the battery reaches to 80° C. to 200° C. at an overcharge state may be added. Thus, the safety device such as a safety vent or a PTC device may be modified or broken, and the current may be shut. Accordingly, the explosion and the ignition of the battery due to the overcharge may be prevented. Particularly, when the charge voltage reaches to 4.8 V for the battery including lithium carbonate, lithium carbonate may be decomposed to generate a carbonate gas, and the internal pressure of the battery may be rapidly increased. Accordingly, the safety vent may operate, a current shutting apparatus may be broken, the current flow may be shut, the temperature of the battery may be restrained to about 50° C. and a thermal runaway may be prevented.

The certain voltage may be greater than or equal to 4.5 V.

The charging of a common lithium secondary battery is performed through a constant voltage/constant current charging. According to this method, the charging voltage is set at a constant voltage of about 4.1 V or 4.2 V, and the charging is performed at a constant current until the battery voltage reaches to the set voltage. After reaching the set voltage, the current value may be naturally decreased. Therefore, when the charging voltage is correctly controlled in a charger, an overcharging phenomenon may not be generated. However, when the charger is broken or malfunctioning, or when an operator misuses the battery, the overcharging may be generated. When the overcharge state is maintained, the voltage of the battery may be increased up to 5.0 V.

Accordingly, when the voltage is greater than or equal to 4.5 V, which is commonly an overcharge state, the current is required to be shut and, the charging is required to be suspended. When the gasification material is vaporized at less than or equal to 4.5 V, the gasification may begin before being overcharged, and the internal pressure of the battery may be increased. In this case, the safety vent may be operated, and the battery may become no longer useful.

The positive electrode active material may include, for example, a lamellar structure compound such as lithium cobalt oxide ($LiCoO_2$), lithium nickel oxide ($LiNiO_2$), and the like, or a substituted compound thereof with one or more transition metals; a lithium manganese oxide compound including $Li_{1+x}Mn_{2-x}O_4$ (in which x is 0 to 0.33), $LiMnO_3$, $LiMn_2O_3$, $LiMnO_2$ and the like; lithium copper oxide ($Li_2CuO_2$); a vanadium oxide compound such as $LiV_3O_8$, $LiFe_3O_4$, $V_2O_5$, $Cu_2V_2O_7$ and the like; a Ni site-type lithiated nickel oxide compound represented by a chemical formula of $LiNi_{1-x}M_xO_2$ (in which, M=Co, Mn, Al, Cu, Fe, Mg, B or Ga, and x=0.01 to 0.3); a lithium manganese complex oxide compound represented by a chemical formula of $LiMn_{2-x}M_xO_2$ (in which, M=Co, Ni, Fe, Cr, Zn or Ta, and x=0.01 to 0.1) or $Li_2Mn_3MO_8$ (in which, M=Fe, Co, Ni, Cu or Zn); $LiMn_2O_4$ in which a portion of Li is substituted with an alkaline earth metal ion; a disulfide compound; $Fe_2(MoO_4)_3$ and the like, without limitation.

In a preferred embodiment, the positive electrode active material may have the following Chemical Formula 1. For example, the positive electrode active material of the following Chemical Formula 1 may be $LiCoO_2$, in which x=1, y=0 and M=Co.

$$Li_xNi_yM_{1-y}O_2 \qquad (1)$$

(wherein, 0.1≤x≤1, and 1≤y≤2,

M is selected from the group consisting of Al, B, Si, Ti, Nb, Mg, Ca, V, Cr, Fe, Co, Cu, Zn, Sn, Zr, Sr, Ba, Ce and Ta.)

In addition, in example embodiments, a lithium secondary battery including a current interrupt device (CID) being operated when the internal pressure of a battery at an overcharge state, and including the electrode assembly is provided.

The lithium secondary battery according to the present invention may be any battery including the current interrupt device (CID), without limitation and may be applied to any lithium secondary batteries of a pouch type, a cylinder type or a polygon type.

In the pouch type lithium secondary battery, for example, the electrode assembly is inserted into the pouch, and the battery is sealed. By using a tab connected to the electrode, an electric passage connecting the electrode in the pouch and an exterior portion may be confirmed. To a bare cell formed through the pouch sealing, a core pack making a connection with a safety device such as a PTC device may be formed by using the tab. The core pack is put in a hard case and combined to complete a hard pack battery. The hard case may be formed by using a polypropylene resin and the like without using a separate circuit or conductor part therein. However, according to the properties of the device using the battery, the separate circuit or other conductor part may be included in the hard case. Particularly, a second receiving part of the pouch including a groove for receiving the electrode assembly and a first receiving part of the pouch for covering the groove may be formed. The groove may be formed through a press process and the like. According to the type of the pouch, the groove may not be formed. A groove for performing a degassing process may be additionally formed besides the groove for receiving the electrode assembly, while conducting the press processing for forming the groove.

In the cylinder type or the polygon type lithium secondary battery, for example, a jelly-roll type electrode assembly is mounted in a metal can, and a negative electrode of the electrode assembly is welded at the lower portion of the can. In order to enclose the battery including the electrode assembly and an electrolyte, the positive electrode of the electrode assembly is welded to the extruded terminal of a top cap combined with the upper terminal of the can. The current interrupt device (CID) is generally installed in a space between the electrode assembly and the top cap in the cylinder type or the polygon type lithium secondary battery. Particularly, the top cap has an extruded shape, forms a positive electrode terminal, and has a punched exhausting hole. At the lower portion of the top cap, a PTC device for shutting a current through largely increasing a battery resistance when the temperature of the internal battery increases, a safety vent having an extruded shape downward at a normal state and for being extruded and exploded when the internal pressure of the battery increases for exhausting a gas, and a connection plate of which one upper side portion making a connection with the safety vent, and of which one lower side making a connection to the positive electrode of the electrode assembly, are disposed one by one. Accordingly, at a normal operation condition, the positive electrode of the electrode assembly is connected to the top cap via the connection plate, the safety vent and the PTC device and accomplishes a current flow. However, when the internal pressure increases due to the generation of a gas from the electrode assembly because of an overcharging and the like, the shape of the safety vent may be reversed and extruded upward. In this case, the safety vent may be separated from the connection plate, and the current may be shut. Therefore, the overcharge may not proceed any further, and the safety may be confirmed. When the internal pressure of the battery increases continuously, the safety vent may be broken, and the pressurized gas may be exhausted via the broken part and through the exhausting hole of the top cap. Thus, the explosion of the battery may be prevented.

Accordingly, when the series of the process is conducted one by one, the safety of the battery may be confirmed. On the contrary, the operation process is absolutely dependent on the amount of the gas generated at the electrode assembly part. Accordingly, when the amount generated of the gas is insufficient or when the amount of the gas does not increase to a certain amount in a short time, the short of the current interrupt device (CID) may be delayed, and the thermal runaway phenomenon may occur due to the continuous electric flow of the electrode assembly. The thermal runaway phenomenon may be generated or accelerated further when the battery is under a continuous electric flowing state.

In connection with the above, a technique of coating the gasification material on the separator has been introduced to prevent the overcharge. Thus manufactured lithium secondary battery includes the gasification material possibly being electrolyzed at a certain voltage for generating a gas, and so, the safety of the battery may be improved. At the same time, the capacity lowering of the battery may be remarkably decreased and the increase of the resistance may be restrained by coating the gasification material not on the electrode but on the surface of the separator.

In addition, a medium-large size battery module or a battery pack including a plurality of electrically connected lithium secondary batteries is provided in the present invention.

The medium-large size battery module or the battery pack may be used as a power source of a medium-large size device of one of a power tool; an electric vehicle including an electric vehicle (EV), a hybrid electric vehicle (HEV) and a plug-in hybrid electric vehicle (PHEV); an electric truck; an electric commercial vehicle; or a system for storing electric power.

The electrode assembly including the separator for improving the safety and the lithium secondary battery including the same according to the present invention includes a gasification material possibly being electrolyzed at an overcharge state to generate a gas to improve the safety of the battery. At the same time, through coating the gasification material not on the electrode but on the separator, the resistance increase may be restrained, the lowering of the battery capacity may be remarkably decreased, and the lifetime of the battery may be good.

Hereinafter, preferred embodiments will be described to help the understanding of the present invention. The embodiments described below are provided only for easy understanding of the present invention, however, are not provided to restrict the present invention.

Example

Manufacture of Lithium Secondary Battery Including Separator Coated with Gasification Material (1) Manufacture of Positive Electrode 89 wt % of $LiCoO_2$ as a positive electrode active material, 4 wt % of carbon black as a conductive material, and 4 wt % of PVdF as a binder were added into N-methyl-2-pyrrolidone (NMP) as a solvent to prepare a positive electrode mixture slurry. The positive electrode mixture slurry was coated on an aluminum (Al) current collector, dried and pressurized to manufacture a positive electrode having a thickness of 200 µm, a length of 450 mm, and a width of 54 mm.

(2) Manufacture of Negative Electrode 96 wt % of a carbon powder as a negative electrode active material, polyvinylidene fluoride (PVdF) as a binder and carbon black as a conductive material was added into N-methyl-2-pyrrolidone (NMP) to prepare a negative electrode mixture slurry. The negative electrode mixture slurry was coated on a copper (Cu) current collector, dried and pressurized to manufacture a negative electrode having a thickness of 200 µm, a length of 510 mm, and a width of 56 mm.

(3) Manufacture of Separator

A polyolefin separator was prepared. On the surface of the separator facing the positive electrode, a lithium carbonate composition including lithium carbonate ($Li_2CO_3$) as a gasification material was coated by means of a 3-roll reverse system to manufacture a separator.

(4) Manufacture of Lithium Secondary Battery

The separator was inserted between the thus manufactured two electrodes and wound to manufacture a jelly-roll type electrode assembly. The electrode assembly and a solution of ethylene carbonate (EC) and ethyl methyl carbonate (EMC) in a volume ratio of 1:2 and including a dissolved lithium salt of lithium hexafluorophosphate (LiPF6), were put into a pouch including a Current Interrupt Device (CID), to manufacture a lithium secondary battery.

Comparative Example

Manufacture of Lithium Secondary Battery Including Positive Electrode Coated with Gasification Material A lithium secondary battery was manufactured by conducting the same procedure described in Example except for coating the gasification material of lithium carbonate ($Li_2Co_3$) on the positive electrode instead of the separator.

Experiment 1

In order to evaluate the safety of the lithium secondary battery according to the present invention, the following experiments were conducted.

The lithium secondary battery manufactured in the Example was used. The battery was overcharged under the condition of 10 V/1 A. Then, the generation of the ignition, the explosion and the smoking was evaluated.

From the experiment, since the lithium secondary battery according to the present invention included the gasification material possibly being electrolyzed at a certain voltage and generating a gas, the internal pressure of the battery was increased, and the current interrupt device (CID) was operated. Thus, no ignition and no explosion were observed, and no smoke was generated.

Since the lithium secondary battery according to the present invention includes the gasification material possibly being electrolyzed at an overcharged state to generate a gas, the safety of the battery was confirmed to be increased.

Experiment 2

In order to measured the resistance of the lithium secondary battery according to the present invention, 0.5 C charging/1.0 C discharging experiments were conducted from the fourth cycle at a voltage range of 4.5 to 2.5 V by using the lithium secondary batteries manufactured in the Example and the Comparative Example, and the results are illustrated in the following Table 1.

TABLE 1

|  | Capacity decrease after 10 cycles (%) | Capacity decrease after 50 cycles (%) | Capacity decrease after 150 cycles (%) |
|---|---|---|---|
| Example | 0.4% | 3% | 8% |
| Comparative Example | 0.5% | 6% | 14% |

In the lithium secondary battery manufactured in the Comparative Example, when compared with the lithium ion secondary battery manufactured in the Example, the battery capacity was maintained to the same degree at the initial part of the cycle. However, a large deviation on the battery capacity was generated at the latter part of the cycle due to the increase of the internal resistance of the battery.

Thus, in the lithium secondary battery in which a gasification material is coated on a separator according to the present invention, the lowering of the battery capacity is remarkably decreased, and the lifetime properties of the battery are good, through coating the gasification material on the separator not on the electrode.

While this invention has been particularly shown and described with reference to preferred embodiments thereof and drawings, it will be understood by those skilled in the art that various changes in form and details may be made therein without departing from the spirit and scope of the invention as defined by the appended claims.

| [Description of reference numeral] | |
|---|---|
| 100: electrode assembly | 110: positive electrode |
| 120: negative electrode | 130: separator |
| 140: gasification material | 200: 3-roll reverse apparatus |
| 210: left roll | 220: central roll |
| 230: right roll | 300: spray apparatus |
| 310: sprayer | 320: left roll |
| 330: right roll | 400: roller |
| 500: cylindrical lithium secondary battery | 510: top cap |
| 520: PTC device | 530: safety vent |
| 540: connecting plate | |

The invention claimed is:

1. A lithium secondary battery comprising:
   a current interrupt device (CID) being operated when an internal pressure of a battery increases to a certain voltage for breaking a current, and
   an electrode assembly comprising a positive electrode, a negative electrode, a separator and an electrolyte,
   wherein the electrolyte comprises cyclohexylbenzene (CHB) and/or biphenyl (BP),
   wherein the separator contains a coating only on a surface facing the positive electrode, wherein the coating comprises a gasification material and a polyvinylidene fluoride (PVdF) resin, wherein the gasification material is lithium carbonate, and
   wherein an amount of the gasification material present is in the range of 0.05 wt % to 10 wt % based on a total amount of a positive electrode material.

2. The lithium secondary battery of claim 1, wherein the certain voltage is greater than or equal to 4.5 V.

3. The lithium secondary batter of claim 1, wherein the separator is selected from the group consisting of polyethylene, polypropylene, a polyethylene/polypropylene double layer, a polyethylene/polypropylene/polyethylene triple layer, a polypropylene/polyethylene/polypropylene triple layer and an organic fiber filter paper.

4. The lithium secondary batter of claim 1, wherein the coating is conducted by one of a 3-roll reverse system, a spray system and a gravure roll system.

5. The lithium secondary battery of claim 1, wherein the positive electrode active material includes the following Chemical Formula 1, $$Li_xNi_yM_{1-y}O_2 \quad (1)$$

wherein, $0.1 \leq x \leq 1$, $1 \leq y \leq 2$, and M is selected from the group consist of Al, B, Si, Ti, Nb, Mg, Ca, V, Cr, Fe, Co, Cu, Zn, Sn, Zr, Sr, Ba, Ce and Ta.

6. A medium or large size battery module or a battery pack including a plurality of electrically connected lithium secondary batteries according to claim 2.

7. A product comprising the medium or large size battery module or the battery pack of claim 6, wherein the product is a power tool, an electric vehicle, or a system for storing electric power.

8. The product of claim 7, wherein the electric vehicle is selected from the group consisting of an electric vehicle (EV), a hybrid electric vehicle (HEV), a plug-in hybrid electric vehicle (PHEV); an electric truck, and an electric commercial vehicle.

* * * * *